(12) United States Patent
Glessner et al.

(10) Patent No.: US 7,334,960 B2
(45) Date of Patent: Feb. 26, 2008

(54) ATTACHMENT DEVICE FOR REMOVABLE COMPONENTS IN HOT GAS PATHS IN A TURBINE ENGINE

(75) Inventors: John C. Glessner, Oviedo, FL (US); Stefan Dahlke, Muelheim a.d. Ruhr (DE); Robert O. Nicosia, Lake Mary, FL (US); Ricardo F. Moraes, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 259 days.

(21) Appl. No.: 11/165,366

(22) Filed: Jun. 23, 2005

(65) Prior Publication Data

US 2007/0031188 A1 Feb. 8, 2007

(51) Int. Cl.
*F16B 21/02* (2006.01)

(52) U.S. Cl. ............... 403/348; 403/336; 403/337; 403/350; 285/376; 285/401; 60/798

(58) Field of Classification Search ............... 403/348, 403/349, 350, 351, 352, 335, 336, 337; 60/796, 60/798; 285/376, 401
See application file for complete search history.

(56) References Cited

U.S. PATENT DOCUMENTS

| | | | | |
|---|---|---|---|---|
| 1,947,743 A * | 2/1934 | Schoeneck | ................. | 285/401 |
| 2,376,566 A * | 5/1945 | Woodling | ................. | 285/376 |
| 2,526,998 A * | 10/1950 | Davis | ......................... | 403/349 |
| 4,074,520 A | 2/1978 | Mansson et al. | | |
| 4,290,387 A | 9/1981 | De Feo et al. | | |
| 4,513,569 A | 4/1985 | Sasaki et al. | | |
| 5,035,398 A * | 7/1991 | Chiang | ...................... | 403/348 |
| 5,211,536 A | 5/1993 | Ackerman et al. | | |
| 5,224,822 A | 7/1993 | Lenahan et al. | | |
| 5,343,694 A | 9/1994 | Toborg et al. | | |
| 5,380,154 A | 1/1995 | Norton et al. | | |
| 5,492,445 A | 2/1996 | Shaffer et al. | | |
| 5,582,077 A * | 12/1996 | Agram et al. | ............... | 403/348 |
| 5,737,913 A * | 4/1998 | Terry | .......................... | 60/796 |
| 5,970,716 A | 10/1999 | Forrester et al. | | |
| 6,217,248 B1 * | 4/2001 | Reiff | ......................... | 403/348 |
| 6,658,853 B2 | 12/2003 | Matsuda et al. | | |
| 2002/0056277 A1 | 5/2002 | Parry | | |
| 2002/0069645 A1 | 6/2002 | Mowill | | |
| 2004/0100035 A1 | 5/2004 | Turnquist et al. | | |

FOREIGN PATENT DOCUMENTS

EP 1 323 983 A2 7/2003
SU 2 194 864 C2 12/2002

* cited by examiner

*Primary Examiner*—Daniel P. Stodola
*Assistant Examiner*—Michael P. Ferguson

(57) ABSTRACT

An attachment device for coupling one or more removable turbine components to a carrier of a turbine engine. The attachment device may include a securement structure rotatable about an axis of rotation and including one or more arms for grasping an arm extending from a support structure. A fastener may extend from the support structure and be inserted into a fastener receiving recess in the securement structure for preventing the securement structure from rotating and becoming disengaged from the support structure. The attachment device may also include a fastener retaining device for preventing the fastener, which may be a threaded bolt, from becoming disengaged from the attachment device, traveling downstream in a turbine, and damaging a turbine assembly.

19 Claims, 5 Drawing Sheets

ATTACHMENT DEVICE FOR REMOVABLE COMPONENTS IN HOT GAS PATHS IN A TURBINE ENGINE

FIELD OF THE INVENTION

This invention is directed generally to retainers, and more particularly to retainers for coupling combustor liners and other releaseable components in hot gas paths in turbine engines.

BACKGROUND

Gas turbine combustors generally may be formed from annular combustors or can combustors. Annular combustors include a combustor chamber that is formed from a plurality of removable turbine components, such as removable liners and other components. These removable turbine components are exposed to extreme heat during operation, which sometimes causes distortions and failure in the removable turbine components. Thus, the removable turbine components are replaced at regular intervals to prevent such failure from occurring during operation.

The removable components are often removably coupled to a carrier, which forms the support structure of the combustor, using either spring clips or bolted configurations. Spring clips couple removable components to each other or to the carrier of a combustor, or both. However, spring clips often suffer from relaxation and creep after being exposed to high temperatures commonly occurring in a combustor chamber, which can result in loss of clamp force in the clips. As a result, spring clips, liners, and removable components can be liberated during operation of a combustor and cause substantial damage. To prevent damage, spring clips must be replaced frequently.

Removable components may also be coupled to a carrier using either a hot side bolted method or a cold side bolted method. The hot side bolted method includes bolting removable components to a carrier by inserting bolts through orifices in a removable component from the hot side of the combustor, which is the inner aspects of the combustor. Removable components installed in this manner may be removed by personnel entering the inner aspects of the combustor through a manhole or other device and loosening the bolts attaching the removable components to a carrier. While removable components attached to a carrier in this manner may be removed easily, this method of attachment has disadvantages and risks. For instance, should the bolts loosen during operation, the bolts pose a threat of becoming disengaged with the carrier, traveling downstream, and damaging the turbine blades. In addition, the bolts are exposed to hot gases in the combustor chamber and are required to be cooled and be made from expensive alloys. Air supplied from a compressor of the turbine combustor is often used to cool the bolts; however, use of air supplied by a compressor increases nitrous oxide emissions and degrades turbine combustor performance.

The cold side bolted method includes using bolts installed from the cold side of the combustor, which is the outside surface of the combustor. The bolts are passed through the carrier and are received by the removable components. Installing bolts in this method alleviates the possibility of bolts loosening and traveling downstream and alleviates the necessity to cool the bolts. However, a significant disadvantage of the cold bolted method is the amount of time needed to access the bolts to remove and replace the removable components. The bolts may not be accessed from the inner aspects of the turbine combustor. Instead, the bolts are accessed only after the engine casing has been lifted, which is a process that may take many hours or weeks. Thus, a need exists for a more efficient system and method for releaseably attaching removable components to carriers of turbine engines.

SUMMARY OF THE INVENTION

This invention relates to an attachment device for coupling one or more turbine engine components, such as hot gas side turbine components, to a turbine engine carrier or related component. The attachment device may be configured such that, once installed, a fastener used to secure the attachment device to the carrier is prevented from being released into the combustor gas stream in the event the fastener is loosened during turbine engine operation. Rather, the configuration of the attachment device prevents the fastener from flowing downstream and damaging other turbine components.

The attachment device may include a support structure with at least one fastener receiving recess for containing a fastener and at least one retention arm extending from the support structure. The retention arm defines at least one recess in the support structure. The support structure may be a portion of the turbine engine carrier or a component attached to the turbine engine carrier. The attachment device may also include a securement structure with at least one fastener receiving recess and at least one retention arm extending from the body of the securement structure. The retention arm extending from the securement structure may be configured to be inserted into the at least one recess formed from the retention arm of the support structure to grasp the at least one retention arm of the support structure after the securement structure has been rotated about an axis of rotation. The attachment device may also include at least one fastener movably coupled to the support structure such that the fastener is moveable between a position in which the fastener extends into the at least one fastener receiving recess of the securement structure and a position in which the fastener is contained within the at least one fastener receiving recess in the support structure enabling the securement structure to be rotated into position in contact with the support structure. The fastener prevents the securement structure from becoming disengaged from the support structure after the securement structure has been rotated and the arm of the securement structure engages the arm of the support structure.

The attachment device may also include a fastener retaining device for preventing the fastener from being removed from the attachment device. In at least one embodiment the fastener retaining device is a wall in the securement structure that prevents the fastener from being removed from the attachment device. The wall may include an orifice in the securement structure sized to prevent the at least one fastener from passing through the orifice, wherein the orifice provides access to the at least one fastener so that a tool may engage the at least one fastener to move the fastener into or out of the fastener receiving recess of the securement structure. By moving the fastener into the fastener receiving recess of the securement structure, the securement structure is prevented from being rotated and becoming disengaged from the support structure. The fastener retaining device may also be formed from a protrusion, such as, but not limited to, a collar, extending from the fastener.

In at least one embodiment, the securement structure may include an outer surface capable of being exposed to the hot gas in the combustor gas flow and for limiting the escape of combustor gases from the combustion gas flow. In concert with this objective, the orifice in the wall that provides access to the fastener may be sized only slightly larger that the tool to be inserted through the orifice so that hot gas intrusion may be limited yet smaller than the fastener to prevent the fastener from passing through the orifice. The outer surface of the securement structure may also be constructed so that the securement structure is substantially flush with adjacent turbine engine components.

The securement and support structures may include central apertures enabling cooling gases to flow through the securement and support structures. The securement and support structures may also include a plurality of arms. The arms, which are configured to engage each other, may have numerous configurations. For instance, the arms on the securement structure may be positioned around a perimeter of the central aperture and extend radially outward, and the arms on the support structure may extend radially inward to engage the arms of the securement structure, or vice versa. In addition, a stop may be attached to one or more of the arms to limit engagement of the securement structure to the support structure to occurring only by rotating the securement structure in a single direction and to facilitate aligning the fastener receiving recess of the securement structure with the fastener.

The securement structure may be coupled to the support structure by aligning the arm of the securement structure with the recess of the support structure. The securement structure may be rotated so that the arm enters the recess of the support structure and engages the arm of the support structure. The securement structure may be rotated until the arm contacts the stop or the orifice is aligned with a fastener. The securement structure may be further secured to the support structure by inserting a tool through the orifice and moving the fastener into the fastener receiving recess of the securement structure. In at least one embodiment, the fastener may be rotated using a tool, such as, but not limited to, a screw driver, an allen wrench, or other appropriate tool. The attachment device may be removed by following these steps in reverse order. The attachment device may be accessed through a port in the combustion chamber enabling service personnel to access the attachment device to attach or remove the attachment device.

An advantage of this invention is that the fastener is prevented from becoming detached from the attachment device by the fastener retaining device. The fastener retaining device prevents the fastener from flowing downstream and damaging downstream components in the attachment device.

Another advantage of this invention is that the arms extending from the support structure and the securement structure and the fastener provide a more secure attachment method than conventional spring clips.

Yet another advantage of this invention is that the attachment device is capable of being installed inside the combustion chamber, thereby enabling quick and easy installation and replacement of the hot gas parts in a timely manner.

Another advantage of this advantage is that the fastener is contained in a recess in the attachment device, thereby minimizing the exposure of the fastener to hot combustion gases. Minimizing the exposure of the fastener enables less expensive materials to be used to form the fastener.

Still another advantage of this invention is that by minimizing the size of the orifice in the securement structure that is in close proximity to the fastener, less cooling air is needed to cool the fastener. This reduction in required cooling air increases the efficiency of the turbine engine.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
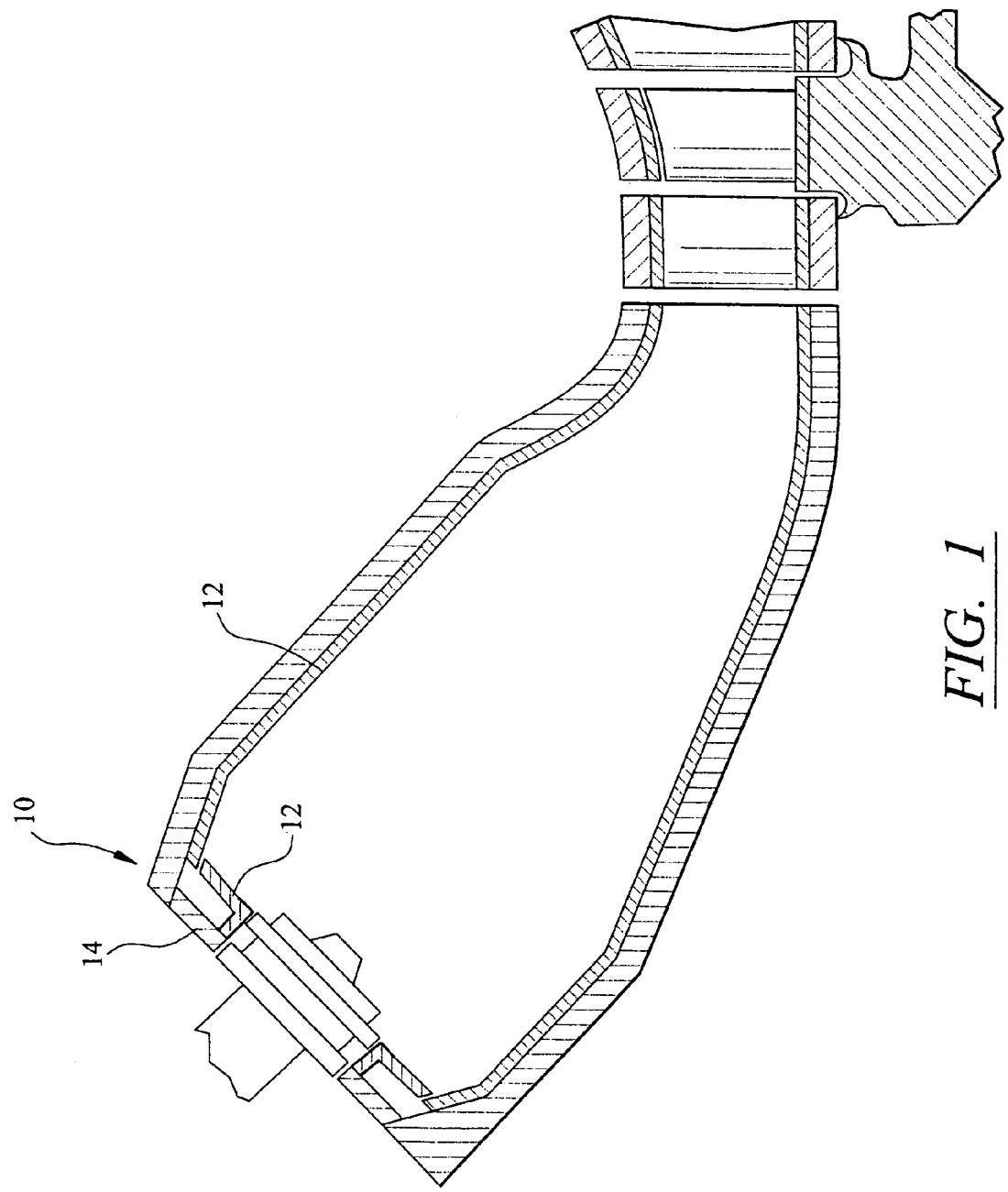
FIG. 1 is a cross-sectional view of an annular turbine combustor.
Figure 2:
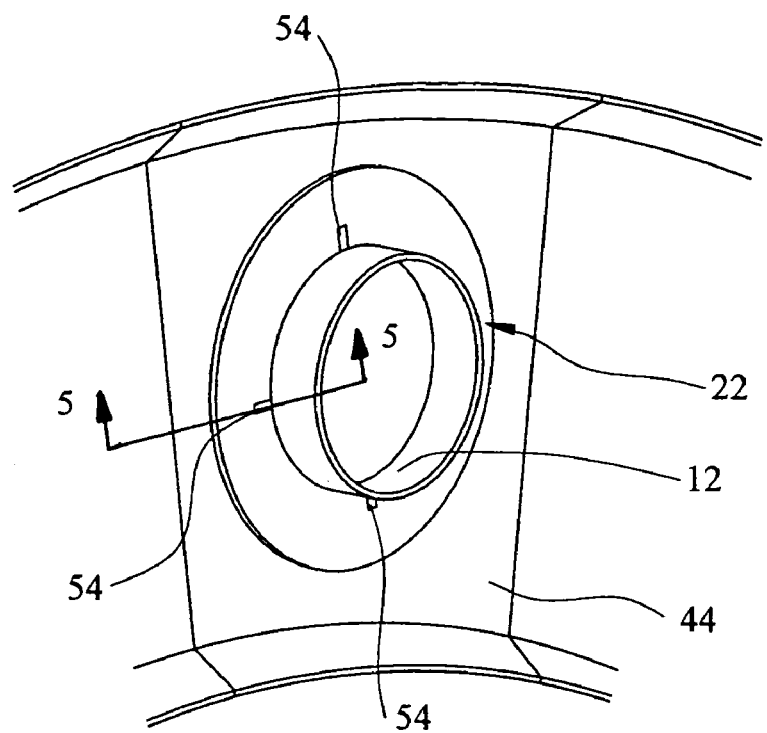
FIG. 2 is a perspective view of a securement structure of this invention installed in a combustion chamber and used to attach a circular shaped combustor gas component to a turbine engine assembly.

As shown in FIGS. 1-9, this invention is directed to an attachment device 10 for coupling one or more turbine engine components 12, such as hot gas side turbine components, to a turbine engine carrier 14 or related component. In at least one embodiment, as shown in FIGS. 1 and 2, the attachment device 10 may be used to couple hot gas turbine components, 12, such as a generally tubular turbine component, to the carrier 14. The attachment device 10 may be configured such that, once installed, a fastener 16 used to secure the attachment device 10 to the carrier 14 may not be released into the combustor gas stream in the event the fastener 16 is loosened during turbine engine operation. In addition, the configuration of the attachment device 10 prevents the fastener 16 from flowing downstream and damaging other turbine components.

Figure 3:
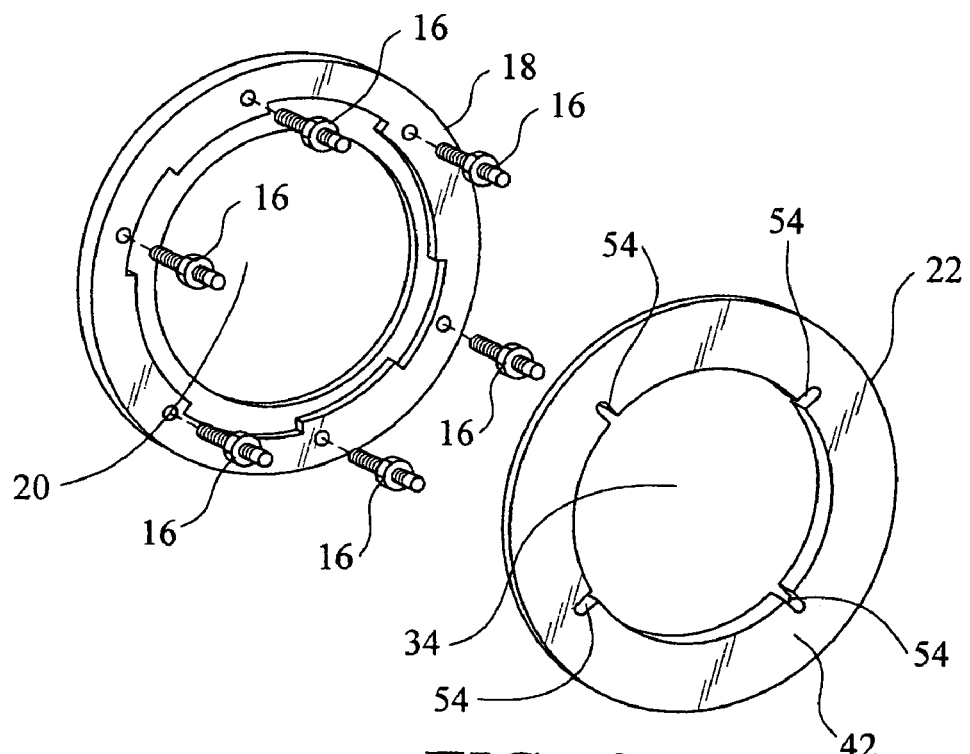
FIG. 3 is an exploded view of the attachment device shown in FIG. 2.

As shown in FIG. 3, attachment device 10 may be formed from a support structure 18. The support structure 18 may be configured to be attached to the carrier 14. The support structure 18 may be attached through any appropriate method, such as, but not limited to, use of mechanical fasteners; such as screws, bolts, and others; welding; brazing; and other appropriate methods. In one embodiment, support structure 18 may be formed from two or more pieces that may be welded together. In yet another embodiment, support structure 18 may be formed from a single piece. Support structure 18 may be formed from materials, such as, but not limited to: aluminum; steel, such as stainless steel; titanium; nickel; nickel alloys; nickel based superalloys; and the like. In at least one embodiment, as shown in FIGS. 2-4, 6, and 7, the support structure 18 may include an aperture 20, which may be a central aperture, for allowing combustor cooling fluid flow to pass through the support structure 18. The support structure 18 may be configured to support a securement structure 22. The support structure 18 may include a releasable attachment mechanism 24 for attaching the securement structure 22 to the support structure 18.

Figure 7:
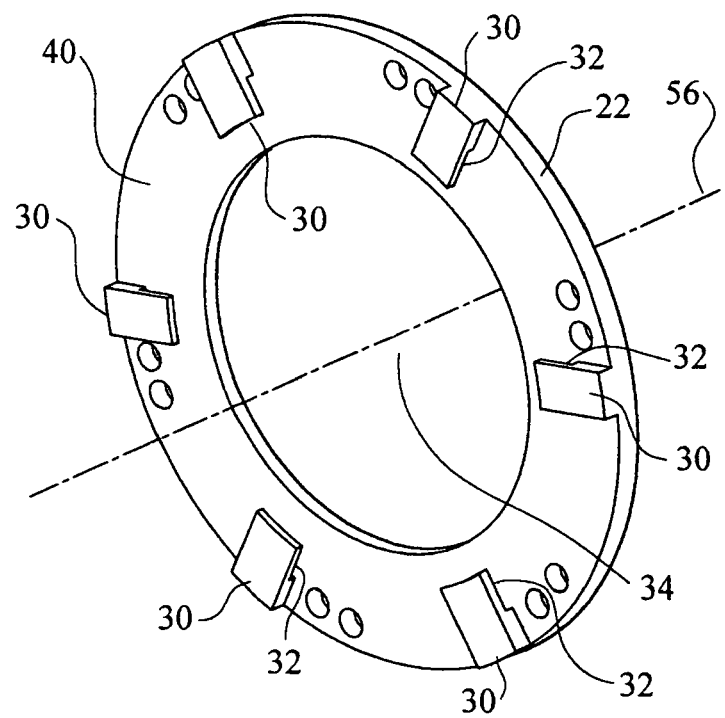
FIG. 7 is a perspective view of another alternative embodiment of the securement structure of the attachment device of the invention.
Figure 8:
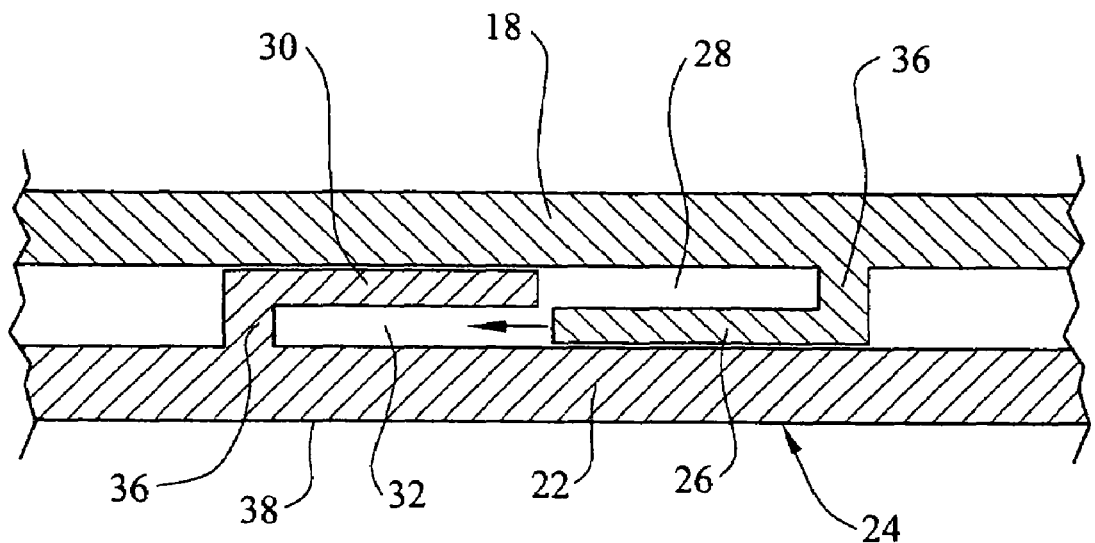
FIG. 8 is a partial cross-sectional view of a portion of the attachment device shown in FIG. 4 during assembly.
Figure 9:
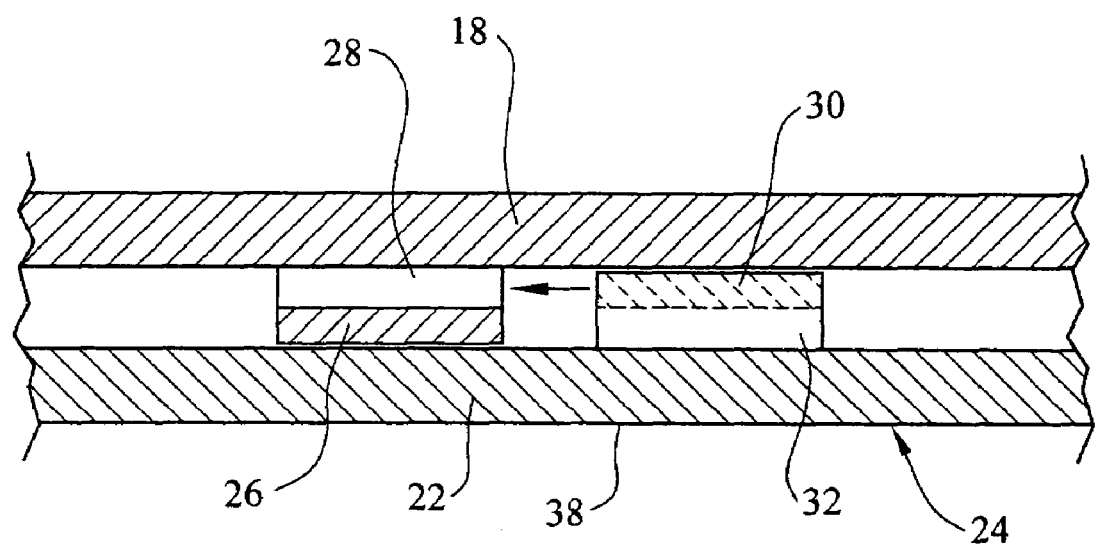
FIG. 9 is a partial cross-sectional view of a portion of the attachment device shown in FIG. 4 during assembly.

As shown in FIG. 8, the releasable attachment mechanism 24 may include one or more arms 26 extending from the support structure 18 forming a recess 28 and one or more arms 30 extending from the securement structure 22 forming a recess 32. In at least one embodiment, the support structure 18 and the securement structure 22 may include a plurality of arms 26, 30, respectively. The arms 26, 30 may be configured such that the arms 26, 30 may interlock when placed in close proximity and the securement structure 22 is rotated relative to the support structure 18, or vice versa, as shown in FIGS. 8 and 9. As shown in FIGS. 3, 4, 6 and 7, the arms 26, 30 extending from the support structure 18 and the securement structure 22 may be have numerous configurations. All arms 26, 30 may be configured substantially identical or have different configurations, or the arms 26 and 30 may be configured substantially identical on each structure 18, 22 but differently relative to the other structure 18, 22.

Figure 4:
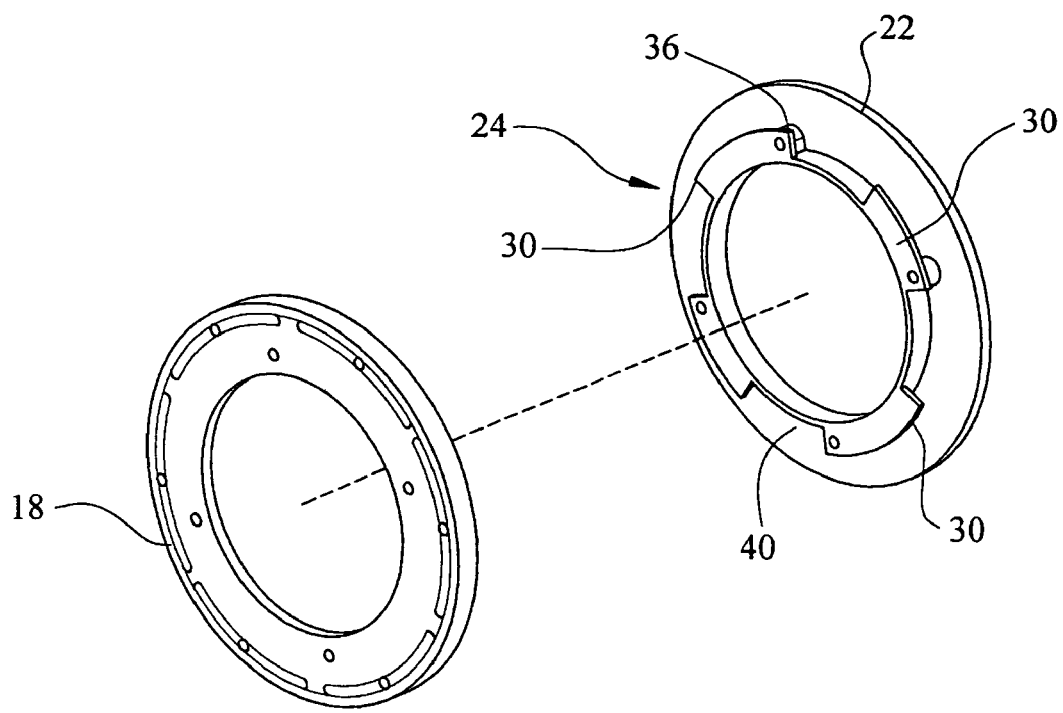
FIG. 4 is a backside exploded view of the attachment device shown in FIG. 2, wherein the view is rotated about 180 degrees from the view in FIG. 3.
Figure 6:
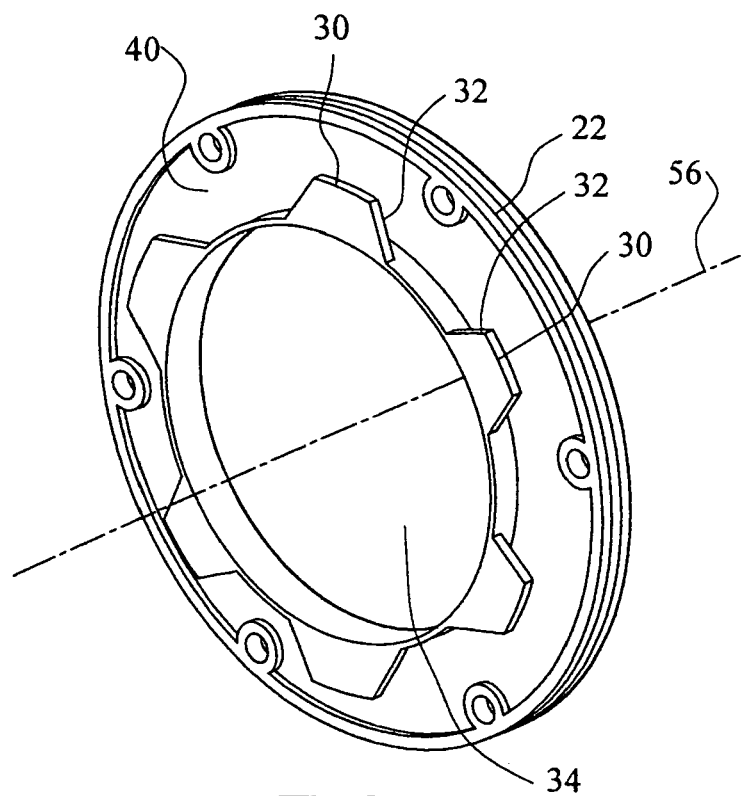
FIG. 6 is a perspective view of an alternative embodiment of the securement structure of the attachment device of the invention.

As shown in FIGS. 3, 4, 6 and 7, the arms 26, 30 may have numerous different configurations. For instance, the arms 30, as shown in FIGS. 3 and 6, may be positioned in close proximity to an aperture 34 of the securement structure 22 and may extend radially outward, and the arms 26 of the support structure 18 may extend radially inward to engage the arms 30 of the securement structure 22. Alternatively, the arms 30, as shown in FIG. 7, may be positioned in close proximity to an aperture 34 of the securement structure 22 and extend radially inward, and the arms 26 of the support structure 18 may extend radially outward to engage the arms 30 of the securement structure 22. As shown in FIGS. 3 and 4, the arms 30 may include a stop 36 configured to limit rotation of the securement structure 22 and to enable engagement of the securement structure 22 and the support structure 18 by rotating the securement structure 22 in a single direction only. In at least one embodiment, the arms 26, 30 may be configured such that an interference fit is created when the arms 26, 30 contact each other during rotation of the securement structure 22 relative to the support structure 18. The arms 26, 30 are not limited to a particular configuration but may have a constant thickness, tapered thickness, rounded edges, chamfers, or other appropriate shapes and sizes.

The securement structure 22 may include an outer surface 38 that is generally opposite to the side from which the arms 30 extend. In at least one embodiment, as shown in FIGS. 3, 6, and 7, the arms 30 extend from a cold gas side 40 of the securement structure 22 and the outer surface 38 forms the hot gas side 42 of the securement structure 22. The outer surface 38 may be configured to be flush with adjacent turbine components 44, which may be combustor liners, when the securement structure 22 is attached.

Figure 5:
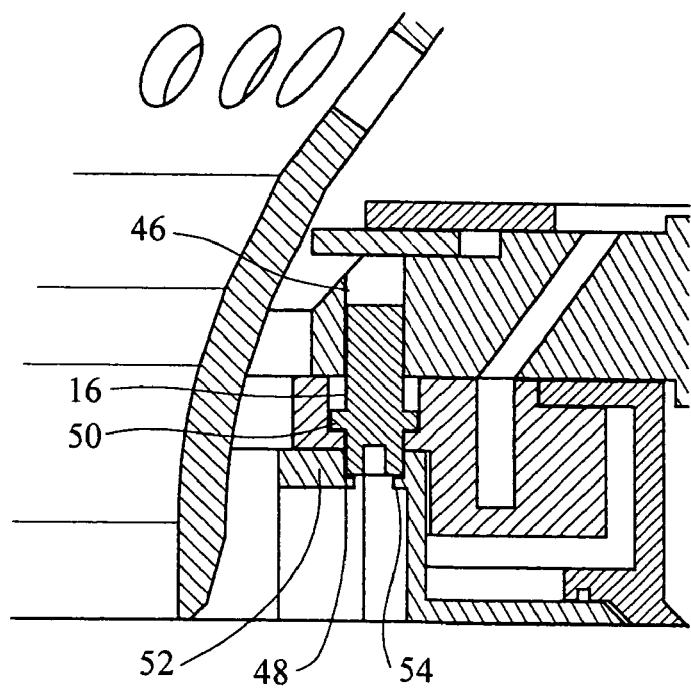
FIG. 5 is a cross-sectional view of a portion of the attachment device taken along section line 5-5 in FIG. 2.

The attachment device 10 may also include one or more fasteners 16 for preventing the securement structure 22 from becoming disengaged from the support structure 18 after the securement structure 22 has been attached to the support structure 18. The fastener 16 may be contained within a fastener receiving recess 46 in the support structure 18 and a fastener receiving recess 48 in the securement structure 22. The fastener 16 may be movably coupled to the support structure 18 such that the fastener 16 may be moveable between a position in which the fastener 16 extends into the at least one fastener receiving recess 48 of the securement structure 22, as shown in FIG. 5, and a position in which the fastener 16 is contained within the at least one fastener receiving recess 46 in the support structure 18 enabling the securement structure 22 to be rotated into position in contact with the support structure 18. In at least one embodiment, the fastener 16 may be a threaded bolt that may be extended by rotating the fastener 16 so that the fastener 16 moves into the fastener receiving recess of the securement structure 22 to prevent the securement structure 22 from rotating. When the securement structure 22 is desired to be removed from the support structure 18, the fastener 16 may be rotated in an appropriate direction to remove the fastener 16 from the fastener receiving recess 48 of the securement structure 22. With the fastener 16 removed from the fastener receiving recess 48 of the securement structure 22, the securement structure 22 is free to rotate and be detached from the support structure 18.

The attachment device 10 may also include a fastener retaining device 50 for preventing the fastener 16 from being removed from the attachment device 10. The retaining device 16 may be any device capable of preventing the fastener 16 from being released from the attachment device 10 whereby the fastener 16 could damage downstream turbine components. In at least one embodiment, the fastener retaining device 50 may be formed from a wall 52 in the securement structure 22 that prevents the fastener 16 from being removed from the attachment device 10. An orifice 54 may extend through the wall 52 in the securement structure 22 that is sized to prevent the fastener 16 from passing through the orifice 54. However, the orifice 54 may be large enough to provide access to the fastener 16 so that a tool can engage the fastener 16 to move the fastener 16 into or out of the fastener receiving recess 48 in the securement structure 22. The wall 52 also acts as a shield by limiting the ability of hot gases to contact the fastener 16. In another embodiment, as shown in FIG. 5, the fastener 16 may include one or more protrusions 56 that prevent the fastener 16 from passing through the orifice 54. The protrusion 56 may be a collar that extends from the fastener 16.

The attachment device 10 may be used to attach a securement structure 22 to a turbine engine to attach a turbine component to a turbine carrier 14 of to form a surface of a combustor or other turbine surface. In at least one embodiment, the fasteners 16 may be installed in the support structure 18. The securement structure 22 may be attached to the support structure 18 by aligning the arm 30 of the securement structure 22 with the recess 28 of the support structure 18. The securement structure 22 may be rotated about an axis of rotation 56 so that the arm 30 enters the recess 28 and engages the arm 26 of the support structure. The securement structure 22 may be rotated until the arm 30 contacts the stop 36 or the orifice 54 is aligned with a fastener 16. The securement structure 22 may be further secured to the support structure 18 moving the fastener 16 into the fastener receiving recess 48 of the securement structure 22. The fastener 16 may be moved by inserting a tool through the orifice 54 and. In at least one embodiment, the fastener 16 may be rotated using a tool, such as, but not limited to, a screw driver, an allen wrench, or other appropriate tool. The attachment device 10 may be removed by following these steps in reverse order. The attachment device 10 may be accessed through a port in the combustion chamber of a turbine engine enabling service personnel to access the attachment device 10.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. An attachment device for attaching turbine components to form a hot gas path within the components, comprising:
    a support structure comprising an annular flange having inner and outer surfaces with at least one axially extending fastener receiving recess for containing a fastener and at least one retention arm extending from the support structure, wherein the at least one retention arm defines at least one recess;
    a securement structure concentrically aligned with the support structure about an axis of rotation, comprising an annular flange having inner and outer surfaces with at least one axially extending fastener receiving recess and at least one retention arm extending from the body of the securement structure and configured to be inserted into the at least one recess formed from the retention arm of the support structure to grasp the at least one retention arm of the support structure after the securement structure has been rotated about an axis the rotation, wherein the outer surface of the securement structure forms a hot gas path outer surface; and
    at least one fastener movably coupled to the support structure, a head of the fastener disposed between the outer surface of the support structure and the inner surface of the securement structure, such that the fastener is moveable between a position in which the fastener extends into the at least one fastener receiving recess of the securement structure thereby preventing rotation of the securement structure relative to the support structure and a position in which the fastener is contained within the at least one fastener receiving recess in the support structure enabling the securement structure to be rotated about the axis of rotation;
    an orifice in the flange of the securement structure that extends through the hot gas path outer surface and enables a tool to be inserted through the hot gas path outer surface from within the hot gas path to engage and move the at least one fastener between positions, and enable the securement structure to be removed in the hot gas path;
    wherein the orifice in the flange of the securement structure is sized to prevent the head of the at least one fastener from passing through the orifice and releasing the fastener into the hot gas path.

2. The attachment device of claim 1, further comprising a fastener retaining device for preventing the fastener from being removed from the attachment device.

3. The attachment device of claim 2, wherein the fastener retaining device comprises a wall in the securement structure that prevents the fastener from being removed from the attachment device.

4. The attachment device of claim 1, wherein the support structure includes a central aperture enabling combustor gases to pass through the support structure and wherein the at least one retention arm extending from the support structure comprises a plurality of retention arms positioned around a perimeter of the central aperture.

5. The attachment device of claim 4, wherein the securement structure includes a central aperture enabling combustor gases to pass through the securement structure and wherein the at least one retention arm extending from the securement structure comprises a plurality of retention arms positioned around a perimeter of the central aperture.

6. The attachment device of claim 5, wherein at least one arm of the plurality of retention arms of the securement structure is attached to the securement structure in close proximity to the central aperture and extends radially outward.

7. The attachment device of claim 6, wherein the at least one arm of the plurality of retention arms of the securement structure includes a stop extending between the at least one arm and the securement structure to facilitate insertion of the at least one retention arm of the support structure by rotating the securement structure in only a first direction.

8. The attachment device of claim 5, wherein at least one arm of the plurality of retention arms of the securement structure is attached to the securement structure and extends radially inward.

9. The attachment device of claim 4, wherein at least one retention arm of the plurality of retention arms of the support structure is attached to the support structure in close proximity to the central aperture and extends radially outward.

10. The attachment device of claim 9, wherein the at least one retention arm of the plurality of retention arms of the support structure includes a stop extending between the at least one retention arm and the support structure to facilitate insertion of the at least one retention arm of the securement structure by rotating the support structure in only a first direction.

11. The attachment device of claim 4, wherein at least one retention arm of the plurality of retention arms of the support structure is attached to the support structure and extends radially inward.

12. The attachment device of claim 1, wherein the at least one fastener comprises a plurality of fasteners positioned in the support structure.

13. The attachment device of claim 1, wherein the securement structure further comprises an outer surface that is generally opposite to the at least one retention arm of the securement structure and is configured to be substantially flush with adjacent turbine components.

14. An attachment device for attaching turbine components to form a hot gas path within the components, comprising:
    a support structure comprising an annular flange having inner and outer surfaces with a central aperture, at least one axially extending fastner receiving recess for containing a fastener, and at least one retention arm positioned round a perimeter of the central aperture and extending from the support structure, wherein the at least one retention arm defines at least one recess that is generally orthogonal to an axis of rotation of the support structure;
    a securement structure concentrically aligned with the support structure about the axis of rotation, comprising an annular flange having inner and outer surfaces with a central aperture, at least one axially extending fastener receiving recess, and at least one retention arm positioned around a perimeter of the central aperture, extending from the body of the securement structure, and configured to be inserted into the at least one recess formed from the retention arm of the support structure to grasp the at least one retention arm of the support structure after the securement structure has been rotated about the axis of rotation, and an outer surface that is generally opposite to the at least one retention arm of the securement structure that forms a hot gas path outer surface and configured to be substantially flush with adjacent turbine components;

at least one fastener movably coupled to the support structure, a head of the fastener disposed between the outer surface of the support structure and the inner surface of the securement structure, such that the fastener is moveable between a position in which the fastener extends into the at least one fastener receiving recess of the securement structure thereby preventing rotation of the securement structure relative to the support structure and a position in which the fastener is contained within the at least one fastener receiving recess in the support structure enabling the securement structure to be rotated;

a fastener retaining device for preventing the fastener from being removed from the attachment device and into the hot gas path once fully assembled; and wherein the securement structure includes an orifice providing access to the at least one fastener through the hot gas so that a tool may extend through the orifice from within the hot gas path and engage and move the at least one fastener in the securement structure between positions, and wherein the orifice is sized to prevent the head of the at least one fastener from passing through the orifice and releasing the fastener into the hot gas path.

15. The attachment device of claim 14, wherein the fastener retaining device comprises a wall in the securement structure that prevents the fastener from being removed from the attachment device.

16. The attachment device of claim 14, wherein the fastener retaining device comprises a protrusion extending from the fastener for preventing the fastener from being removed from the attachment device.

17. The attachment device of claim 14, wherein the at least one arm extending from the securement structure is in close proximity to the central aperture of the securement structure and extends radially outward and the at least one arm extending from the support structure and extends radially inward.

18. The attachment device of claim 17, wherein the at least one arm extending from the securement structure includes a stop extending between the at least one arm and the securement structure to facilitate insertion of the at least one arm of the support structure by rotating the securement structure in only a first direction.

19. The attachment device of claim 14, wherein at least one arm extending from the securement structure extends radially inward and the at least one arm extending from the support structure in close proximity to the central aperture of the securement structure extends radially outward.

* * * * *